March 19, 1940.  W. S. GRAHAM  2,194,202
GROUND WORKING IMPLEMENT
Filed Aug. 2, 1937  3 Sheets-Sheet 1

Inventor
William S. Graham

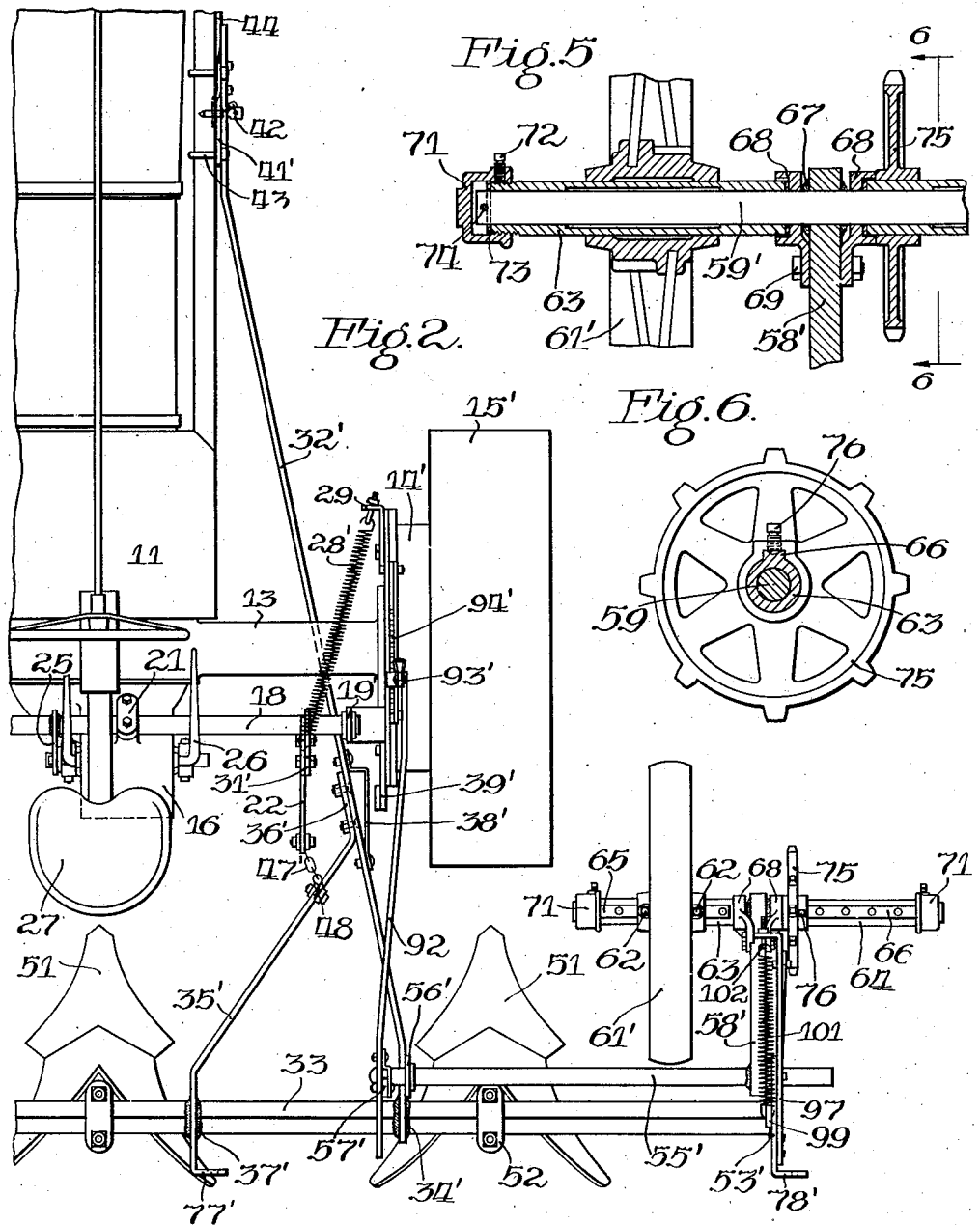

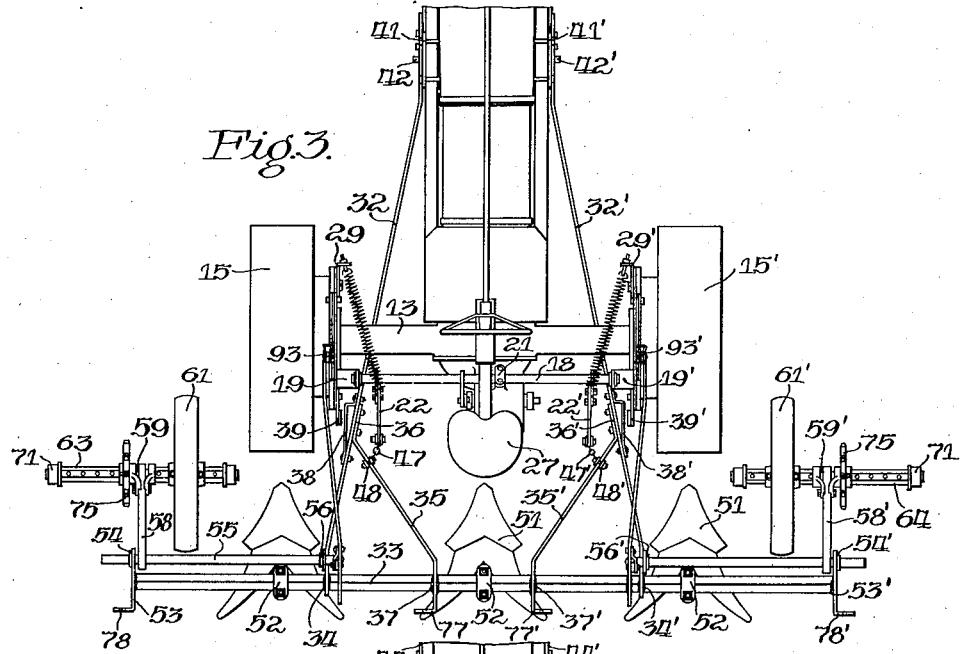

Patented Mar. 19, 1940

2,194,202

UNITED STATES PATENT OFFICE 2,194,202

GROUND WORKING IMPLEMENT

William S. Graham, Canton, Ill., assignor to International Harvester Company, a corporation of New Jersey Application August 2, 1937, Serial No. 156,855

15 Claims. (Cl. 97—103)

This invention relates to ground working implements and particularly to the type of implements which carries a plurality of working tools on a single transverse tool bar and supported by carrying wheels mounted for adjustment at each end of the transverse bar, wherein adjustment of these carrying wheels regulates the depth of digging of the implements.

Some of the advantages of the lateral tool bar type of implement are that the implement lends itself to multiple uses wherein different kind of tools may be applied to the single tool bar for different ground working operations and that these tools may be spaced in accordance with the row spacings desired. The implement may be adapted for one row operation of for operation of several rows. The implement has use for original plowing and planting and later for cultivating, depending only upon the type of tool applied to the tool bar. To maintain the utility of this type of implement, it is desirable that only a minimum number of auxiliary elements be carried by the transverse bar in addition to the spaced tool elements; for these elements consume space on the bar, allowing less combination of arrangements of the tools and thus limiting the use of the implement. In prior constructions, elements such as carrying wheels and planter hoppers have been directly clamped to the tool bar; thus preventing freedom of adjustment and mounting of the tool elements. Any changes of the tool arrangement necessitated a readjustment of the entire wheel carrying structure along the bar and the same had to re-aligned before ready for use.

It is, therefore, the object of this invention to provide an improved tool bar implement wherein there is less hindrance from auxiliary elements in the proximity of the tool bar.

It is another object of this invention to provide an improved mounting structure for the carrying wheels which may be permanently mounted on the implement frame wherein no re-alignment is necessary after adjusting the wheels for different row spacings.

It is another object of the invention to provide an improved means for mounting the auxiliary elements.

According to the present invention, there is provided a carrying wheel which may be itself readily removed when the greater number row spacings is desired. This wheel is carried on a double spindle connecting means and may be removed from one side of the spindle to the other without necessitating or changing the adjustment of a carrying wheel arm. The adjusting lever, instead of being carried by the tool bar, is moved to a point on the tractor remote therefrom, thus leaving more space on the tool bar structure. Also, there is provided a bracket on each end of the tool bar which serves a triple function, thus eliminating the separate and independent mounting of three items longitudinally of the transverse bar which would consume space thereon.

For further objects and a better understanding of this invention, reference may be had to the following description taken in connection with the accompanying drawings, in which:

Figure 2 is a plan view in part showing more in detail the carrying wheel and its associated structure;

Figure 3 is a plan view showing lister implements arranged for three-row plowing and with the carrying wheels in the narrow setting;

Figure 4 is a plan view showing the implement converted into a four row lister planter and the carrying wheels placed on the outside ends of the carrying spindles;

Figure 5 is a cross-sectional plan view of the carrying wheel structure and showing how the carrying wheels are mounted thereon; and, Figure 6 is a view taken on the line 6—6 of Figure 5 showing a sprocket for driving the seed hoppers and key portion of a carrying wheel sleeve.

Figure 1:
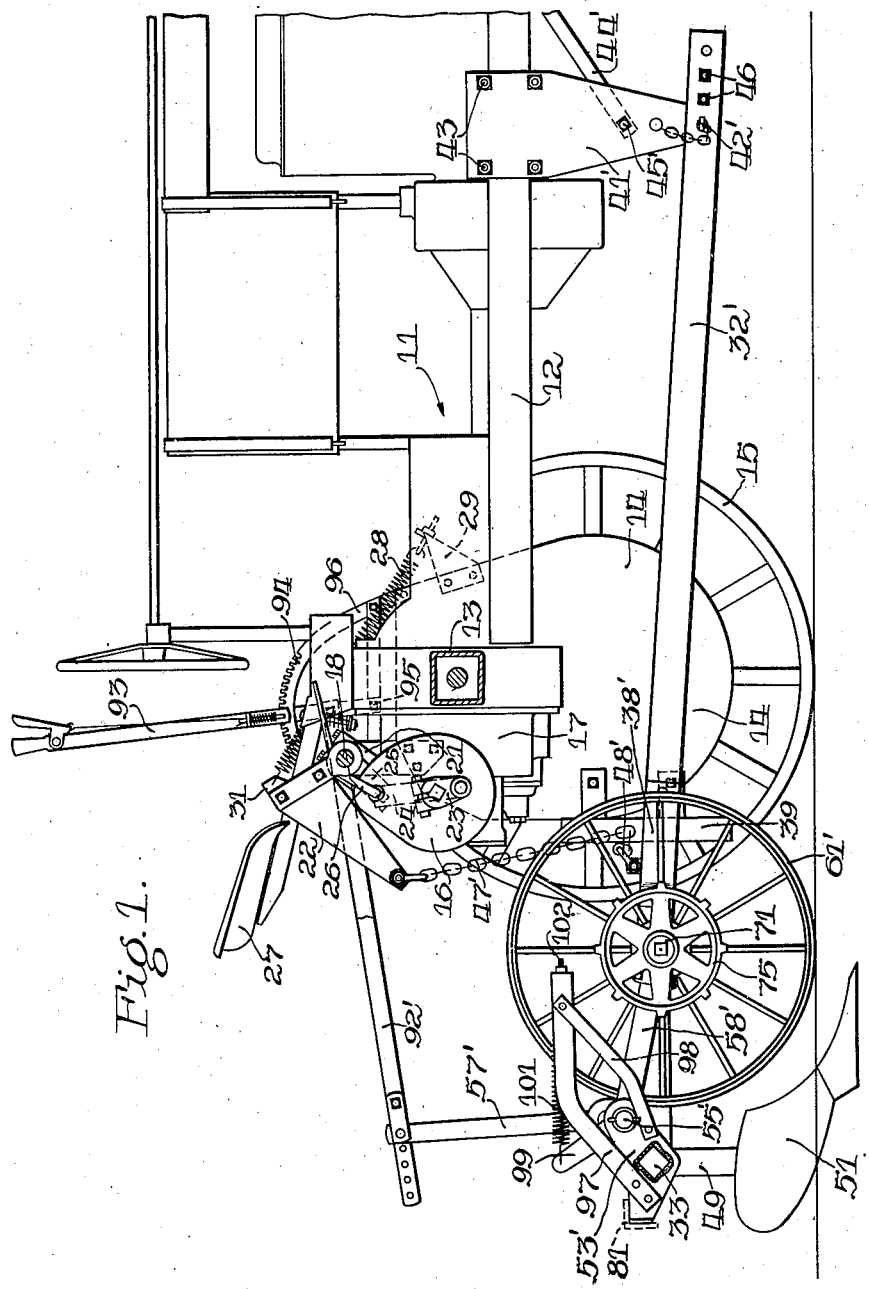
Figure 1 is a side elevational view showing a tractor with one wheel removed and the implement having the novel features of the present invention.

Before proceeding further, it should be understood that the features of the invention reside in the implement structure regardless of the type of tools which are being used. For purpose of illustration, there is being shown lister plow tools, but other types of tools might well have been shown on the tool bar.

In general, there is shown a tractor 11 having side rails 12, a rear axle housing 13, and drop axle housings 14 and 14' with rear wheels 15 and 15'. The tractor also has a usual power lift 16 mounted rearwardly of the rear axle 13 and driven by a tractor transmission 17. There is provided a usual power lift rockshaft 18 supported at its ends in bearings 19 and 19' carried respectively by the drop axle housings or tractor side plates 14 and 14'. The rockshaft 18 is supported centrally of its ends in a center rockshaft bearing 21 mounted on the housing for the transmission 17. The rockshaft may be rocked to effect operation of lifting arms 22 and 22' by a crank 23 attached to a pitman 24 which is, in turn, connected to the rockshaft 18 by an arm 25. Actuation of the power lift may be instituted by a hand lever 26 on the power lift and located near an operator's station 27.

In order to assist in the operation of the power lift device, there are provided usual helper springs 28 and 28' connected at one end to a helper spring bracket 29 and 29' fixed to their respective tractor side plates and connected at the other end to spring anchors 31 and 31' on the respective lifting arms 22 and 22'.

The implement frame comprises generally two rearwardly extending pull irons 32 and 32' which have welded at their rear ends a transverse tool bar 33, as indicated at 34 and 34', and having auxiliary brace members 35 and 35' fixed thereto at points 36 and 36', intermediate the ends thereof. These brace members are also welded at their rear ends as at 37 and 37'. The pull irons 32 and 32' may also have connected on the outside faces thereof rub brackets 38 and 38' adapted to rub against rub plates 39 and 39' respectively carried by the tractor side plates 14 and 14' in order to limit the lateral swing of the implement during operation.

The forward ends of the pull irons 32 and 32' are detachably connected to hitch plates 41 and 41', respectively, by pull pins 42 and 42'. These hitch plates are connected to the tractor side sills by U-bolts 43 and are maintained from sliding rearwardly on the side sills and to take up the strain by respective hitch plate pull straps 44 and 44' bolted to the tractor at its forward end and to the hitch plate, as indicated at 45 and 45', respectively. Arrangement may also be made in connecting the ends of these pull irons so that the implement may be adjusted to a different type of tractor, as provided by additional bolt holes 46 in the forward ends of the pull irons. The entire implement frame is connected for pivotal movement about the pins 42 and 42' to raise the frame from ground engaging position to transport position through the means of chains 47 and 47' connected to the auxiliary members 35 and 35' at 48 and 48' and to the lifting arm 22 and 22', respectively. It should be understood that while there is shown a direct connected type of implement for tractors, the invention is not to be limited in its entirety necessarily to a tractor type of implement, but to include the drawn type not carried by the tractor.

The tool bar 33 is preferably of square cross-section to which a tool beam 49 of a ground working tool 51, as for instance a lister plow bottom, may be attached at any of a plurality of positions by means of a clamping cap 52. It can be seen that the tool may be located at any of a plurality of positions on the tool bar by simply loosening the clamping cap 52 and moving the tool along the tool bar. The tool bar, as shown in Figure 3, has thereon three working tools spaced for any desired row spacing, such as thirty-eight or forty inches. The tool bar 33 is sufficiently long to provide one other tool implement to take care of four rows, as shown in Figure 4. In this regard, it may be said that the arrangement of the tools on the tool bar, as shown in Figure 3, is for initial listing of the ground or for middle-busting of previously listed row ridges. In this initial listing operation, the implement must withstand the greatest strain since the ground is not in a working condition, but being initially put into use. In Figure 4, there is shown the implement arranged for the planting of four rows after the ground has been previously worked. It is thus seen that the number of tools used depends upon the condition of the soil to be worked. Once the three row plow has passed through the soil, four rows may be planted without placing undue strain on the implement.

Welded to the ends of the tool bar 33 are multiple-function bracket plates 53 and 53' which contain one of the features of the present invention. By having these plates so arranged as to serve several functions, space is not consumed on the tool bar and the tools may be more readily attached or adjusted on the same. One of the functions of these plates is to provide outside bearings 54 and 54' for respective pivot axles 55 and 55' mounted on the tool bar 33 and connected at their respective inner ends in bearings 56 and 56' provided on the ends of the respective pull irons 32 and 32'. The pivot axles, at their inside ends, extend upwardly to provide operating arms 57 and 57' whereby the pivot axles 55 and 55' may be rocked in their bearings, each being independent of the other. Fixed to the pivot axles near their bearings 54 are respective, longitudinally disposed, carrying wheel arms 58 and 58', on the free ends of which are respectively fixed double wheel carrying spindles 59 and 59'. It will thus be seen that movement of the operating arms 57 and 57' will cause rotation of the respective spindles 59 and 59' in a vertical plane. It may further be said that the pivot axle portion 55 and arms 57 and 58 provide crank means by which carrying wheels are mounted on the implement and thereby provide means for connecting the carrying wheels.

These spindles 59 and 59' have detachably mounted thereon respective implement carrying wheels 61 and 61' which serve to carry the implement when the same is in ground engaging position and may be regulated, as described further, to adjust the plowing depth of the working plow tools. The wheels also serve, as will be described later, to operate the hopper devices when the implement frame is converted into a lister planter.

The specific wheel 61' and spindle structure 59' will now be described. The structure is identical to the structure on the opposite side of the implement and the present description thereof will apply therefor. The carrying wheels may be fixed by means of set screws 62 on either an inside wheel sleeve 63 or an outside wheel sleeve 64, which have, respectively, projection portions 65 and 66 adapted to fit respectively in keyway slots in the hub of the wheel 61' for drivingly connecting the wheel to the sleeve. In each of these sleeve key portions are located holes in which the set screws 62 may be disposed for the different width of a single row spacing. This latter feature, of course, gives further means of adjustment after changing the wheels from one of the spindles to the other. These sleeves are journaled for rotation on inside and outside extending portions of the wheel spindle 59. The spindle 59 is welded in the end of the arm 58', as indicated at 67 in Figure 5. In order to prevent sand and dirt from getting into the ends of the sleeves near the arm 58, there are provided sand collars 68 fixed to the end of the arm 58 by bolt means 69. In order to close the outer ends of the sleeves, there are provided screw cup members 71 that may be threaded to the sleeve and held in place by means of set screws 72. The sleeves 63 and 64 are maintained on the spindles by a washer 73 and a cotter pin 74 which may be removed upon first removing the cup member 71. It will be understood as the implement travels, the carrying wheel 61 and wheel sleeve 63 will rotate on the spindle 59, with the journal bearing fully sealed from dirt which is so prevalent when operating farm tools. It should also be seen that there will be no necessity during the change over to disconnect the bearing surfaces and expose them to possibility of receiving dirt. Thus, there is provided broadly an improved attachable wheel for a farm implement.

When the wheels are mounted inside the ends of the tool bar they are in position for the plowing operation to initially break up the ground. When it is desired to use the frame as a planter and to include four planter mechanisms, it becomes necessary to remove the wheel and place them on the outside wheel sleeve. In so doing, no other apparatus has to be removed as with prior constructions. The wheel mounting structure is thus permanently mounted on the implement frame and no re-alignment of the same is necessary to change over the wheels.

In order that the wheel may also operate to drive the planter hopper mechanism, there is provided a sprocket 75 which is fixed to the inner ends of the outside wheel sleeves by means of a set screw 76 and thereby drivingly connected with the wheel. The wheel, in this change over position, is now adapted to run on the ridges formerly made during the plow operation with the arrangement shown in Figure 3, but to include four furrow forming devices, as shown in Figure 4, thus planting four rows at a time.

In order to provide means for mounting the hoppers, there are provided on the ends of the auxiliary members 35 and 35' angle projections 77 and 77'. The above mentioned plates 53 and 53' also have like angle projections 78 and 78', and thereby providing a second function of these plates. A pair of seed hoppers 79 are adapted to be carried by each of the angle hopper supports 81 and 82 that is adapted to fit over and be secured to the projections 77—78 and 77'—78', respectively, Figures 1 and 4. The hoppers may thus be placed in position two at a time eliminating necessary adjustment of single hoppers placed on the tool bar wherein space would be consumed thereon as done heretofore. On the outside ends of each of the angle hopper supports 81 and 82 are feed shaft bearing members 83 and 84 for feed shafts 85 and 86 for driving the hopper mechanisms. On these feed shafts near to the bearing members are located sprockets 87 and 88 which are drivingly connected by means of chains 89 and 91 to the sprockets 75 on the outer projections of the spindles 59 and 59', respectively. It will thus be seen that any rotation of the carrying wheels will drive the hopper mechanisms.

Connected to upwardly extending arms 57 and 57' of the pivot axles 55 and 55' are respective depth adjusting links 92 and 92' which are respectively connected forwardly to the lower end of adjusting levers 93 and 93' which are adapted to be worked about quadrants 94 and 94' fixed to the tractor side plates. The adjusting levers 93 and 93' pivot about points 95 on quadrant braces 96, connecting the two ends of the quadrants. It will now be seen that there has been provided an adjusting lever for the carrying wheels, which, instead of being mounted on the implement frame, is carried by the tractor at a location near the operator's station 27. In addition to the greater leverage that is attained, the same is removed from the implement and thus helps, in accordance with the spirit of the present invention, to make the tool bar more accessible.

A third function of the end plates 53 and 53', Figures 1 and 2, is that they provide a support for a helper spring bracket 97 and a helper spring bracket brace 98. Each of the pivot axles 55 and 55' have projection arms 99 adapted to rotate therewith and have fixed thereto helper springs 101, one for each carrying wheel, which in turn are fixed at their forward ends to the helper bracket 97 by means of eye-bolts 102. This spring 101 serves to assist the operator in making an adjustment of the carrying wheel for lifting the working tools out of the ground. Forward movement of the adjusting lever 93 and the vertical arm 57 will be assisted by the helper spring 101, already under tension, by acting on the arms 99 of the pivot axle 55.

It should now be seen that the present invention has provided an arrangement of parts wherein the implement used for instance, as a multiple may be readily converted into a planter, allowing for easy manipulation of the parts upon making the change-over to a planter, also, where it is no longer necessary to remove all of the wheel mounting structure, but simply a removal of the wheel from the inside to the outside projections of the spindle and without exposing journal bearing faces. The arrangement also provides means whereby the hopper drive chains are readily accessible. Also, the use of the end plates having the three functions of supporting the hoppers and associated mechanism, the pivot axles, and the helper spring brackets on a single plate conserves considerable space on the tool bar, making it unnecessary to attach to the tool bar separate brackets for each one of these structures.

It shall be understood that while various modifications may be made in the present invention, they shall be made without departing from the spirit and scope of the invention as defined in the appended claims.

What is claimed is:

1. In a ground working implement, means for mounting a plurality of working tools transversely of the implement for different row spacings, carrying wheels and separate means for connecting the same to the mounting means, and means for mounting the wheels on the connecting means in a plurality of transverse positions to correspond to a selected row spacing of the working tools.

2. In a ground working implement of the type having a transverse tool bar along which individual tools may be positioned, carrying wheels and separate means for connecting the same to the tool bar, and means for mounting each of the wheels on the connecting means at a plurality of positions along a plane parallel to the transverse bar.

3. In a ground working implement of the type having a transverse tool bar along which working tools may be positioned depending in number upon the number of the rows to be covered, carrying wheels and means for connecting the same to the tool bar, and means for maintaining each of the wheels in different positions along a plane parallel to the tool bar on the connecting means to adapt the carrying wheels for the different settings of the working tools on the tool bar.

4. In a ground working implement of the type having a transverse tool bar along which a plurality of working tools may be positioned depending in number upon the number and spacing of rows to be covered, carrying wheels, and an extended axle means for each of the carrying wheels adapted to hold the wheels in a plurality of positions depending upon the number and spacing of working tools on the tool bar.

5. In a ground working implement of the transverse tool bar type along which working tools may be positioned depending in number upon the number of rows to be covered, carrying wheels and means for detachably mounting each of the wheels for adjustment in a plane parallel to the tool bar comprising two spindles on either of which the wheels may be mounted depending upon the number of rows to be covered.

6. In a ground working implement, an implement frame on which a plurality of working tools may be positioned depending in number upon the row spacings desired, carrying wheels for supporting the implement frame and tools, and means for connecting each of the wheels to the frame having a plurality of spindles spaced laterally of the implement frame on which they may be selectively mounted depending upon the row spacing of the working tools.

7. In a ground working implement, an implement frame, working tools therefor, means for mounting the working tools at different lateral spacings on the frame, carrying wheels for supporting the frame and tools, and means for mounting the wheels to the frame comprising an arm means connected to the frame, and a double spindle fixed at substantially its mid-point to the arm means and adapted to carry the wheel on either side of the mid-point dependent upon the desired lateral spacing of the tools on the frame.

8. In a ground working implement, an implement frame, working tools therefor, means for mounting the working tools at different lateral spacings on the frame, carrying wheels for supporting the frame and tools, each of which have hub portions, means for mounting the wheels on the frame comprising an extended spindle of greater length than the hub portion of the wheels, and an extended sleeve journaled on the spindle and the said wheels adapted to be adjusted along the length of the sleeve dependent upon the desired lateral spacing of the tools on the frame.

9. In a ground working implement, an implement frame and working tools therefor, means for mounting the working tools at different lateral spacings on the frame, carrying wheels for supporting the frame, each of which having a hub portion, means for mounting the wheels on the frame comprising an arm means connected to the frame, a two side spindle fixed substantially near its mid-point to the arm, each side being extended greater in length than the hub portion of the wheel, wheel sleeves journaled on the spindles and substantially the same length as the spindles, wherein said wheels may be positioned on either side of the spindle and adjusted along the length of the spindle sleeve, depending upon the desired row spacing of the tools on the implement.

10. In a ground working implement, an implement frame of the tool bar type adapted to carry laterally spaced working tools, depth adjustable carrying wheels, means for mounting the wheels on the implement frame, helper spring means for assisting in the adjustment of the carrying wheels, and bracket means fixed to the ends of the tool bar, leaving the bar substantially free for mounting of tools throughout its entire length, and adapted to have both the wheel mounting means and the assisting springs attached thereto.

11. In a ground working implement, an implement frame of the tool bar type adapted to carry laterally spaced working tools and to be convertible into a planter, depth adjustable carrying wheels, means for mounting the wheels on the implement frame, helper spring means for assisting in the adjustment of the carrying wheels, planter hopper mechanisms adapted to be positioned on the implement along the tool bar, and multiple function bracket means adapted to have the carrying wheel mounting means, the helper spring assisting means, and hopper mechanism attached thereto.

12. In a ground working implement having carrying wheels mounted for easy removal and being subject to considerable dirt, and means for mounting the wheels comprising a spindle and spindle enclosing means journaled to the spindle, and said wheels being removably and adjustably mounted on the spindle enclosing means whereby the journal surfaces of the spindle and enclosing means are left unexposed upon removal of the wheel from the implement and upon adjustment of the wheels upon the spindle enclosing means.

13. In a ground working implement, a frame, a plurality of working tools mounted thereon, carrying wheels for supporting the frame and tools, and means for mounting the wheels on the frame comprising an arm means connected to the frame and a double spindle fixed at substantially its mid-point to the arm means and adapted to carry the wheel on either side of the mid-point.

14. In an implement structure adapted to carry laterally spaced working tools and to be convertible into a planter, a frame, carrying wheels for supporting the frame, means for mounting each of the wheels on the frame comprising an arm means connected to the frame and two spindle portions, wheel sleeves adapted to be journaled on the spindle portions and to either of which a wheel may be drivingly connected, one of the sleeves having a driving gear fixed thereto, a hopper mechanism adapted for attachment to the frame to convert the implement into a planter whereupon the wheel is placed on the sleeve having the gear, and means for drivingly connecting the hopper mechanism with the driving gear to be driven therefrom.

15. In a ground working implement, a frame adapted to have working tools connected thereto in a plurality of positions depending upon the number and spacing of rows to be covered, carrying wheels, and an extended axle means for each of the carrying wheels adapted to hold the wheels in a plurality of positions depending upon the number and spacing of working tools on the tool bar.

WILLIAM S. GRAHAM.